(12) United States Patent
Talton

(10) Patent No.: US 10,581,663 B2
(45) Date of Patent: Mar. 3, 2020

(54) LIGHTWEIGHT SOFTWARE MANAGEMENT SHELL

(71) Applicant: CA, Inc., New York, NY (US)

(72) Inventor: John Talton, Carthage, NC (US)

(73) Assignee: CA, Inc., New York, NY (US)

(*) Notice: Subject to any disclaimer, the term of this patent is extended or adjusted under 35 U.S.C. 154(b) by 0 days.

(21) Appl. No.: 16/030,816

(22) Filed: Jul. 9, 2018

(65) Prior Publication Data

US 2019/0013994 A1    Jan. 10, 2019

Related U.S. Application Data

(60) Continuation of application No. 15/398,075, filed on Jan. 4, 2017, now Pat. No. 10,020,981, which is a division of application No. 14/062,714, filed on Oct. 24, 2013, now Pat. No. 9,628,550.

(51) Int. Cl.
*H04L 12/24* (2006.01)
*H04L 29/08* (2006.01)

(52) U.S. Cl.
CPC ............ *H04L 41/046* (2013.01); *H04L 41/20* (2013.01); *H04L 67/10* (2013.01); *H04L 67/34* (2013.01); *H04L 41/0806* (2013.01); *H04L 41/0893* (2013.01)

(58) Field of Classification Search
None
See application file for complete search history.

(56) References Cited

U.S. PATENT DOCUMENTS

| | | |
|---|---|---|
| 6,452,856 B1 | 9/2002 | Forbes et al. |
| 7,747,730 B1 | 6/2010 | Harlow |
| 8,452,856 B1 | 5/2013 | Lent et al. |
| 9,047,109 B1 | 6/2015 | Wang et al. |
| 2005/0038848 A1 | 2/2005 | Kaluskar et al. |
| 2007/0005957 A1 | 1/2007 | Sahita et al. |
| 2007/0169121 A1 | 7/2007 | Hunt et al. |
| 2007/0180450 A1 | 8/2007 | Croft et al. |
| 2007/0204266 A1 | 8/2007 | Beaty et al. |
| 2008/0134176 A1* | 6/2008 | Fitzgerald ........... G06F 9/45537 718/1 |
| 2009/0172125 A1 | 7/2009 | Shekhar et al. |
| 2010/0242045 A1* | 9/2010 | Swamy .................. G06F 9/455 718/104 |
| 2012/0042033 A1 | 2/2012 | Ayala, Jr. et al. |

(Continued)

*Primary Examiner* — Sargon N Nano
*Assistant Examiner* — Christopher B Robinson
(74) *Attorney, Agent, or Firm* — Kowert, Hood, Munyon, Rankin & Goetzel, P.C.

(57) ABSTRACT

A software management shell may provide an execution environment for one or more software agents, e.g., by creating new instances of itself on a suitable hardware platform. For example, such a management shell may address new or shifting requirements that renders a software agent non-compliant by creating a new management shell that meets the new or shifting requirements. A new management shells may learn and advertise its capabilities and capacity to assist existing management shells in meeting the new or shifting requirements. The creation of new management shells, and the migration of software agents between shells, may be in response to policy changes that govern how the software agents are to operate within the management shells and on a given hardware platform.

14 Claims, 9 Drawing Sheets

(56) References Cited

U.S. PATENT DOCUMENTS

| | | |
|---|---|---|
| 2012/0246640 A1 | 9/2012 | Marshall et al. |
| 2013/0007216 A1* | 1/2013 | Fries .................... G06F 9/4856 709/218 |
| 2013/0152076 A1 | 6/2013 | Patel |
| 2014/0108475 A1 | 4/2014 | Yamada et al. |
| 2014/0310386 A1 | 10/2014 | Srinivasan et al. |

* cited by examiner

LIGHTWEIGHT SOFTWARE MANAGEMENT SHELL

The present application is a continuation of U.S. application Ser. No. 15/398,075, filed Jan. 4, 2017 (now U.S. Pat. No. 10,020,981), which is a divisional of U.S. application Ser. No. 14/062,714, filed Oct. 24, 2013 (now U.S. Pat. No. 9,628,550); the disclosures of each of the above-referenced applications are incorporated by reference herein in their entireties.

BACKGROUND

The present disclosure relates generally to execution environments for computer systems, and more particularly to systems and methods for dynamically distributing execution environments across computing devices.

As businesses expand their mission, they must often also expand or modify their software infrastructure. For example, as a business begins handling additional clients, it may find that its existing software processes are starved for resources. Therefore, the business may need to add additional capabilities to their existing software infrastructure. Similarly, an increase in the diversity of clients may require that a business implement new software services to handle requests that are particular to individual clients.

Generally, software entities have an associated management overhead. For example, some software entities might configure a device to service confidential data, and thus, may only be executed on certain well-protected hardware platforms. In some cases, such software entities may be located only at certain geographic locations. Other software entities may require the use of a particular type of hardware circuit (e.g. a graphics card, a printer) or access to certain software resources (e.g. a license server, a cryptographic key) that are only available on certain hardware platforms.

BRIEF SUMMARY

The present disclosure provides a computer-implemented method and apparatus for a lightweight software management shell. According to one aspect of the present disclosure, a computer-implemented method comprises executing a first execution environment for a software agent on a computing device. The first execution environment is configured to manage the software agent according to a policy associated with the first execution environment. The method further comprises configuring a second execution environment for the software agent in response to receiving an event indication associated with the software agent. The policy associated with the first execution environment is communicated to the second execution environment, thereby configuring the second execution environment to manage the software agent according to the policy associated with the first execution environment. The software agent is migrated from the first execution environment to the second execution environment.

According to another aspect of the present disclosure, a computer-implemented method comprises receiving, from a first execution environment managing a software agent, a configuration request to configure a second execution environment for the software agent. The method further comprises receiving, from the first execution environment, a policy associated with the first execution environment. The second execution environment is configured to manage the software agent according to the policy associated with the first execution environment and the software agent is executed in the second execution environment in compliance with the policy.

According to another aspect of the present disclosure, an apparatus comprises a computing device configured to execute a first execution environment for a software agent on the computing device, and the first execution environment configured to manage the software agent according to a policy associated with the first execution environment. The apparatus is further configured to configure a second execution environment for the software agent in response to receiving an event indication associated with the software agent. The apparatus communicates the policy associated with the first execution environment to the second execution environment thereby configuring the second execution environment to manage the software agent according to the policy associated with the first execution environment and migrate the software agent from the first execution environment to the second execution environment.

According to another aspect of the present disclosure, an apparatus comprises a computing device configured to process a configuration request, sent by a first execution environment managing a software agent, to configure a second execution environment for the software agent. The apparatus is further configured to process a policy, sent by the first execution environment, associated with the first execution environment. The computing device configures the second execution environment to manage the software agent according to the policy associated with the first execution environment and executes the software agent in the second execution environment in compliance with the policy.

According to another aspect of the present disclosure, a non-transitory computer readable medium carries program instructions for instructing a computing device to execute a first execution environment for a software agent on the first computing device, the first execution environment configured to manage the software agent according to a policy associated with the first execution environment. The program instructions instruct the computing device to configure a second execution environment for the software agent in response to receiving an event indication associated with the software agent. The computing device is instructed to communicate the policy associated with the first execution environment to the second execution environment thereby configuring the second execution environment to manage the software agent according to the policy associated with the first execution environment and migrate the software agent from the first execution environment to the second execution environment.

According to another aspect of the present disclosure, a non-transitory computer readable medium carries program instructions for instructing a computing device to process a configuration request, sent by a first execution environment managing a software agent, to configure a second execution environment for the software agent. The program instructions further instruct the computing device to process a policy, sent by the first execution environment, associated with the first execution environment. The computing device is instructed to configure the second execution environment to manage the software agent according to the policy associated with the first execution environment and execute the software agent in the second execution environment in compliance with the policy.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
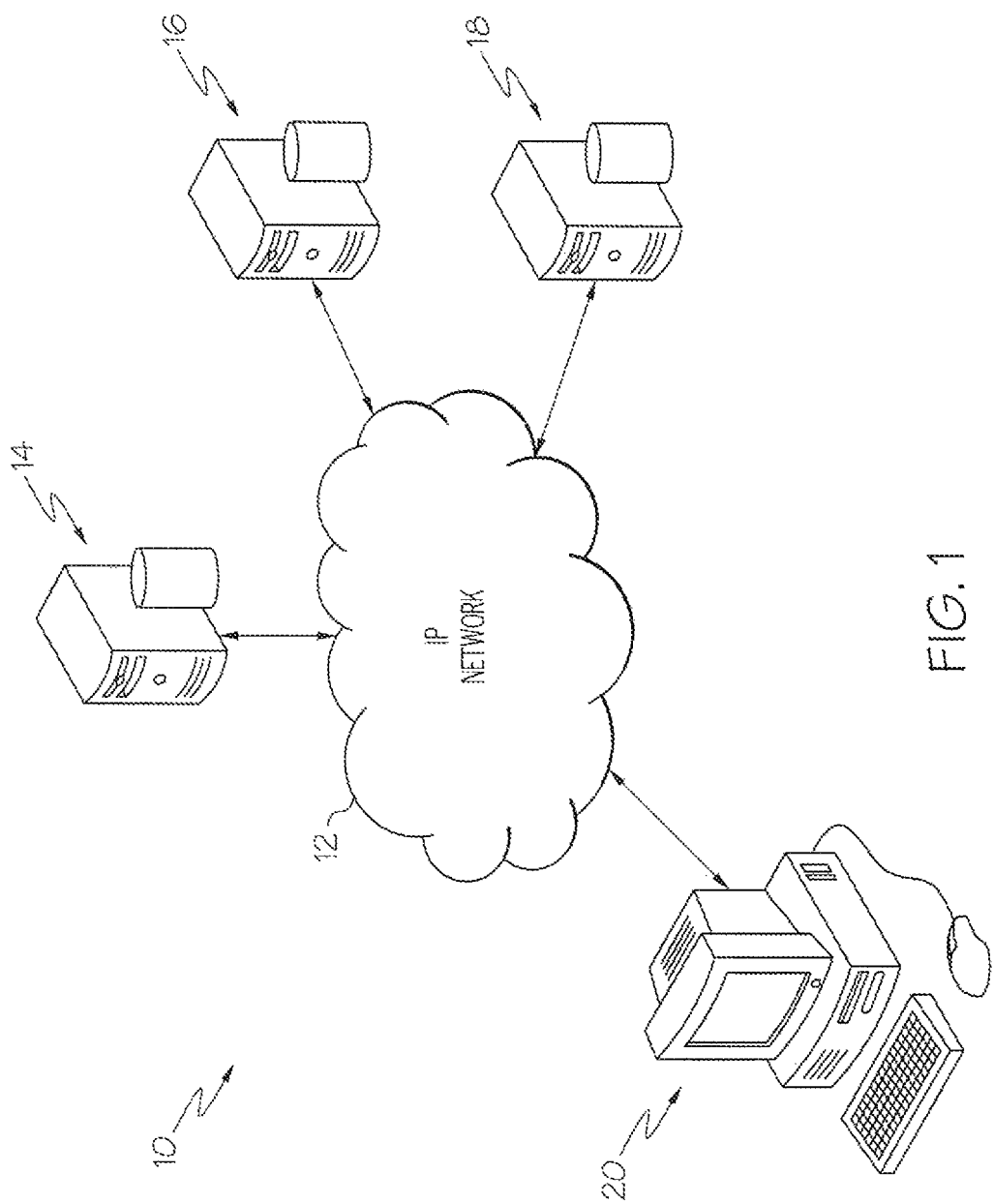
FIG. 1 is a block diagram of a networked computing environment configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a lightweight software management shell that, when executed on a computing device such as a network server, for example, intelligently and autonomously provides a suitable execution environment for one or more software agents. As defined herein, management shells are containers for one or more of software agents, which are instances of software, such as applications, services, webpages, and scripts. In accordance with the present disclosure, management shells are configured to perform functions with respect to the control and management of these software agents. For example, management shells may launch and/or terminate instances of these software agents within the management shell, spawn new management shells to execute the software agents on the same or different hardware platform or device, migrate instances of software agents to other management shells on the same or different hardware platform, and receive instances of software agents from other management shells for execution.

To facilitate managing the software agents, each management shell controls the execution of its respective software agents in accordance with a set of policies. Different management shells may have the same or different set of policies, and may propagate those policies to other management shells. Further, each management shell may have the same or different capabilities with respect to managing the software agents, and is configured to advertise those capabilities to other management shells. Armed with the knowledge of the capabilities of the other management shells, a given management shell that may be no longer able to manage a given software agent is able to migrate that software agent to another more appropriate management shell.

The management shell may migrate the software agent to another existing management shell that is executing on either the same platform or a different platform. However, if an appropriate management shell does not readily exist, the management shell that is migrating the software agent may spawn or create a new management shell especially to execute the software agent on the same platform, or on a different platform.

By way of example, consider a software agent that, when executed within a management shell, provides a security function to a user. To perform the security function, the software agent may require certain resources, such as a specific amount or area of memory. If the software agent determines that it can no longer access the desired memory area, or that a required amount of memory is no longer available, the management shell currently providing the execution environment for the software agent can locate, or spawn, another management shell that is able to handle the memory needs of the software agent. Since each management shell advertises its capabilities to other management shells, the management shell that is migrating the software agent (i.e, the "source" management shell) would know which of the other management shells, if any, could handle the software agent. Once a "target" management shell is found, the source management shell may autonomously move or copy the software agent to the target management shell.

Referring now to the drawings, FIG. 1 is a block diagram of a communications network 10 configured according to one embodiment of the present disclosure. As seen in FIG. 1, network 10 comprises an IP network 12 that communicatively interconnects a plurality of network servers 14, 16, 18 with one or more user terminals 20, and any number of other client or network-based computing devices. While not explicitly shown in the figures, such user terminals 20 may include, but are not limited to, devices such as laptop or desktop computing devices and mobile communication devices, as is known in the art.

Generally, IP network 12 comprises a communications network capable of communicating audio, video, signals, data, messages, and the like, between the network servers 14, 16, 18, terminal 20. Exemplary networks comprise public or private data networks, Local Area Networks (LANs), Wide Area Networks (WANs), WiFi, Near Field Communications (NFC) networks, local, regional, or global computer networks, such as the Internet, for example, wireless and/or wireline networks, intranet networks, and any combination thereof. As is known in the art, the information communicated by IP network 12 may be communicated according to communications protocols and technologies defined by any known standard. Some exemplary standards include, but are not limited to, those standards promulgated by one or more well-known bodies and organizations such as the Institute of Electrical and Electronics Engineers (IEEE) Inc., the International Telecommunications Union (ITU-T), the European Telecommunications Standards Institute (ETSI), the Internet Engineering Task Force (IETF), the Third Generation Partnership Project (3GPP), and the like.

The network servers 14, 16, 18 may comprise any suitable computing device operable to process data. Some examples of the network servers 14, 16, 18 include a host computer, a web server, a file server, an application server or any other device operable to process data. Each of the network servers 14, 16, 18 may execute with any of the well-known operating systems such as MS-DOS, PC-DOS, OS-2, MAC-OS, MICROSOFT WINDOWS, UNIX, or other appropriate operating system, and may provide at least some of the hardware and/or software resource required by the software agents.

In accordance with the present disclosure, each server 14, 16, 18 provides a platform on which one or more management shells execute. Each management shell, in turn, provides an execution environment for one or more software agents. Typically, the user terminal 20 communicates with the software agents via IP network 12 to request and receive services, obtain data, and perform other functions as needed or desired.

Figure 2:
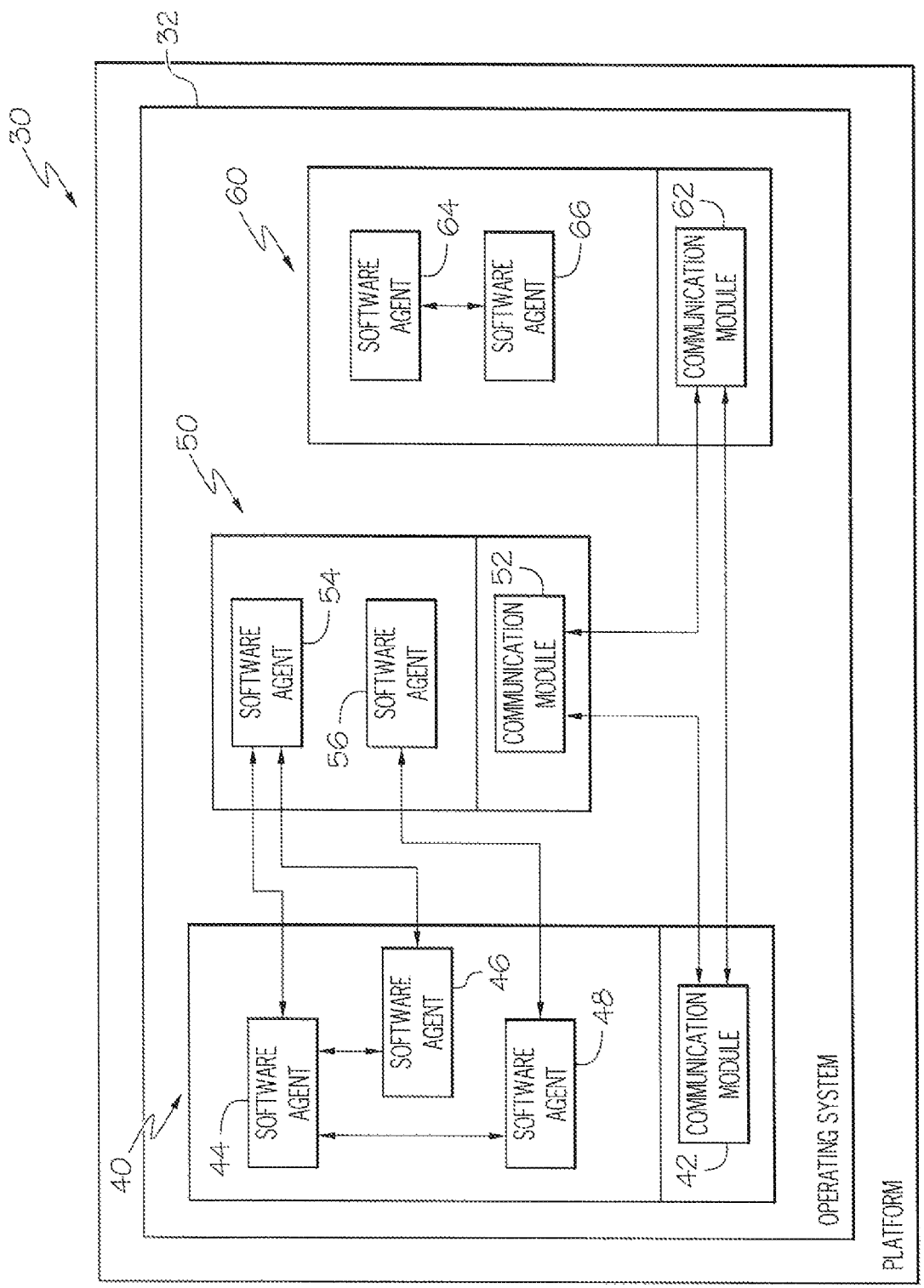
FIG. 2 is a block diagram of a hardware platform executing multiple management shells, each management shell managing multiple software agents according to one embodiment.

FIG. 2 is a block diagram illustrating one such platform 30 provided by a network server (e.g., server 14) according to one embodiment of the present disclosure. As seen in FIG. 2, platform 30 comprises an operating system (OS) 32 and one or more management shells 40, 50, 60 configured according to the present disclosure. Each management shell 40, 50, 60 further comprises one or more software agents 44, 46, 48, 54, 56, 64, and 66 that provide services and data to user terminal 20.

The platform 30 provides the hardware and/or software resources the management shells 40, 50, 60 need to control and manage each of their respective software agents. Such resources include, for example, the physical ports over which the software agents and management shells 40, 50, 60 communicate with other entities, the memory circuits that store data, the processing circuits that execute the software agents and management shells 40, 50, 60, and the software services that are provided by OS 32.

Platform 30 may be configured to execute any number of management shells; however in this embodiment, platform 30 executes three different management shells 40, 50, and 60. Each management shell 40, 50, 60 provides an execution environment for its respective software agents. That is, the management shells 40, 50, 60 are configured to provide their respective software agents with the hardware and/or software resources they need to fulfill their respective functions. As described in more detail later, each management shell 40, 50, 60 operates according to a set of policies and capabilities. If a given management shell can no longer provide one of its software agents with needed resources, then that management shell is configured to migrate the software agent to another management shell that is capable of handling the needs of the software agent. Alternatively, in some embodiments, a management shell may spawn a new management shell that is able to handle the needs of the software agent on the same or a different platform.

Management shells 40, 50, 60 each operate independently of each other, but may communicate information and data to each other regarding, inter alia, their software agents. To accomplish this, each management shell 40, 50, 60 comprises a respective communication module 42, 52, 62. The communication module 42, 52, 62 comprises the code and instructions necessary to communicate information and data between management shells 40, 50, 60 when executing on a platform such as platform 30. As described in more detail later, the communication module 42, 52, 62 is part of the base management shell services, and is created when a management shell is created or spawned.

The communication modules 42, 52, 62 may utilize any known method for communicating data and messages with the communication modules 42, 52, 62 of the other management shells 40, 50, 60. However, by way of example only, some possible methods include inter-process communications, shared memory, common file storage, point-to-point network communication, multicast network communication, and broadcast network communication. Further, the communications between the management shells 40, 50, 60 may be secure or unsecure as needed or desired.

As previously stated, the software agents 44, 46, 48, 54, 56, 64, and 66 that provide services and data to user terminal 20. Such services may include, for example, security services, authentication services, or any service generally requested by, or for, a user terminal 20. The software agents in each management shell 40, 50, 60 may be configured to communicate information and data with other software agents to fulfill a client request, for example, or to obtain data needed for its own operations or functions. Similarly to the management shells 40, 50, 60, communications between software agents may be secure or unsecure, and can be facilitated using any known method of delivering messages between software entities within a computing system. Such communications may comprise, for example, inter-process communication, the use of shared memory and/or common file storage, point-to-point network communication, multicast network communication, and broadcast network communication.

Communication between the software agents may depend on whether the software agents have discovered each other, which may be accomplished using any well-known method of discovery. In such cases, the software agents may, upon discovery and authentication, automatically negotiate and establish a communications link between them. Alternatively, or in addition, any given software agent may be specifically configured to seek out and automatically connect to another predetermined software agent. Such may be the case when a first software agent, such as software agent 44, requires information or data that it must first retrieve from another software agent, such as software agent 46 or software agent 54.

As seen in FIG. 2, some software agents, such as software agent 42, are configured to communicate with other software agents in the same or different management shell. Other software agents, such as software agents 64, 66, are configured to communicate only with each other. In some cases, software agents may be blocked from communicating with one or more other software agents. Such may be the case, for example, with a security-related software agent in which only predetermined software agents may communicate with it.

Figure 3:
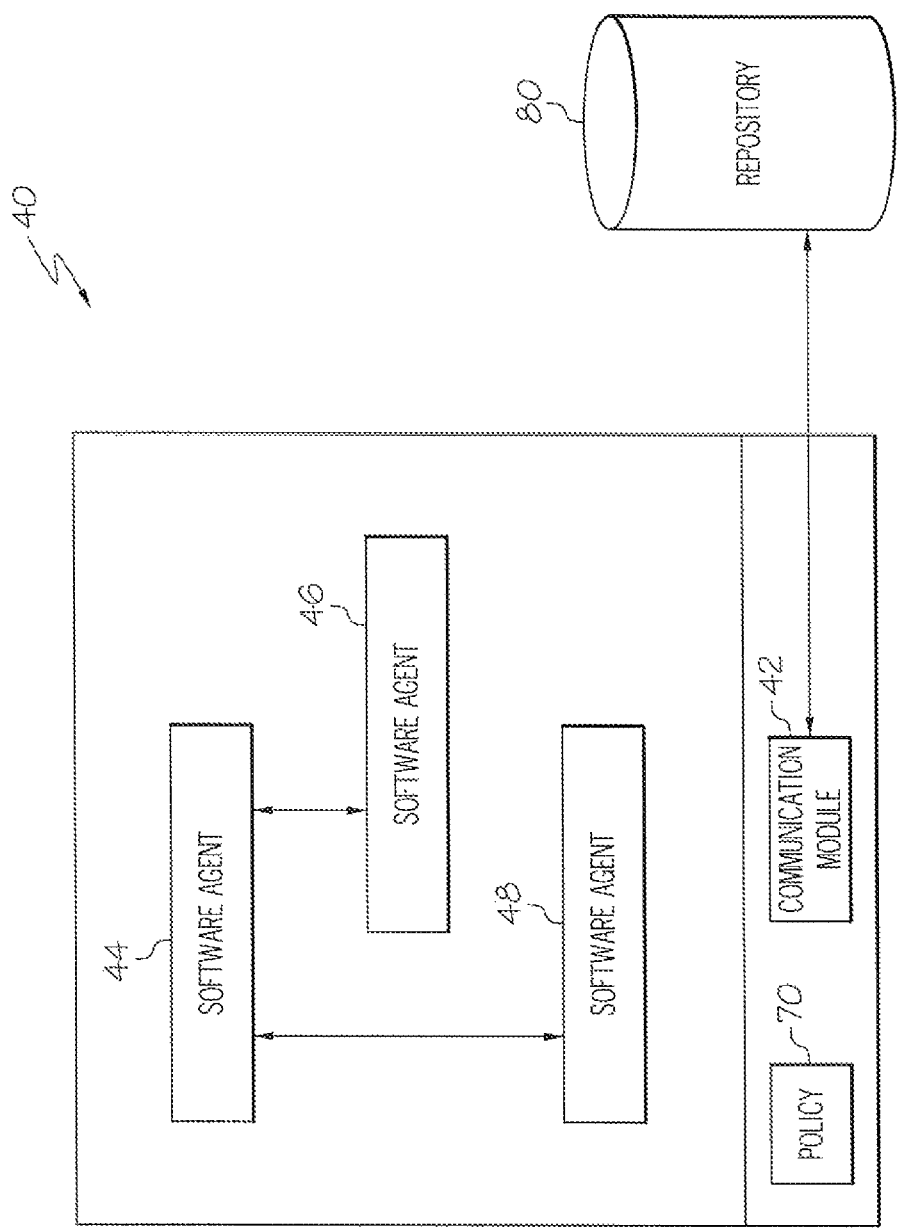
FIG. 3 is a block diagram of a management shell managing software agents according to a policy and with access to a software repository according to one embodiment.

FIG. 3 is a block diagram illustrating management shell 40 in more detail. For illustrative purposes only, management shell 40 is specifically described; however, those of ordinary skill in the art will appreciate that other management shells, such as management shells 50 and 60, may be configured to function in a similar manner.

Management shell 40, in this embodiment, controls and manages three software agents 44, 46, 48, and is communicatively coupled to a software repository 80 via communication module 42. The software repository 80 comprises, for example, a data store on the same hardware platform 30 that is executing the management shell 40. In some embodiments, however, software repository 80 may comprise a remote data store resident on a remote platform. Additionally, the software repository 80 may be dedicated to a single management shell, or shared by multiple management shells.

The executable code for a given software agent may be stored within the software repository 80. When needed, management shell 40 is configured to retrieve a copy of the desired software agent from the software repository 80, and subsequently instantiate a new instance of the software agent within its execution environment by executing the software agent. Once the newly instantiated software agent is executing, the existing software agents 44, 46, 48 within the management shell 40 can discover and begin communicating with the newly instantiated software agent.

As seen in FIG. 3, management shell 40 also comprises a policy file 70 that comprises one or more different policies. Each policy comprises one or more different rules that define how the management shell operates. The policies and rules may be provisioned by an operator of the server on which the management shell 40 is executing, or they may be learned by the management shell 40 and used to create new policies and/or update existing policies autonomously. In one embodiment, for example, an initial or default set of policies are included with the management shell 40 when the management shell 40 is instantiated. The default policies may be generated for management shell 40, or be copied to the management shell 40 from another management shell. Thereafter, based on parameters and information such as the performance of its functions and feedback from one or more software agents 44, 46, 48, the initial set of policies are modified and other new policies are created at management shell 40.

In one aspect, the policies in the policy file 70 control how management shell 40 behaves and manages its software agents 44, 46, 48. For example, the policies in the policy file 70 may limit management shell 40 to communicating with a limited number of other predefined management shells. In these cases, the policy file 70 may include an address or other indicator to identify those particular management shells, along with one or more parameters required by management shell 40 to establish communication and/or authenticate the other management shells.

The policies in the policy file 70 may also control the manner in which management shell 40 handles user access, data security, software licenses, hardware utilization, and software agent prioritization. For example, in embodiments where the policies control software licenses, the policies may limit the management shell 40 to execute only a predefined number of software agents covered by a given license. In another embodiment, the policies may limit the number of instances of a given software agent that may be instantiated within management shell 40. In some embodiments, the policies in the policy file 70 control user access to one or more of the software agents 44, 46, 48. In such cases, a user at user terminal 20 may not be able to access all of the software agents 44, 46, 48 executing within the management shell 40, but instead, may only be able to access predetermined ones of the software agents 44, 46, 48.

In one embodiment, the policies in policy file 70 are used to control the utilization of certain hardware and/or software resources. In such cases, one or more of the software agents 44, 46, 48 may be prevented from accessing certain predetermined hardware or resources, or be limited in their use of such hardware or resources. This type of control can help the management shell 40 manage the resource usage of the software agents during periods of peak loading, for example.

Figure 4:
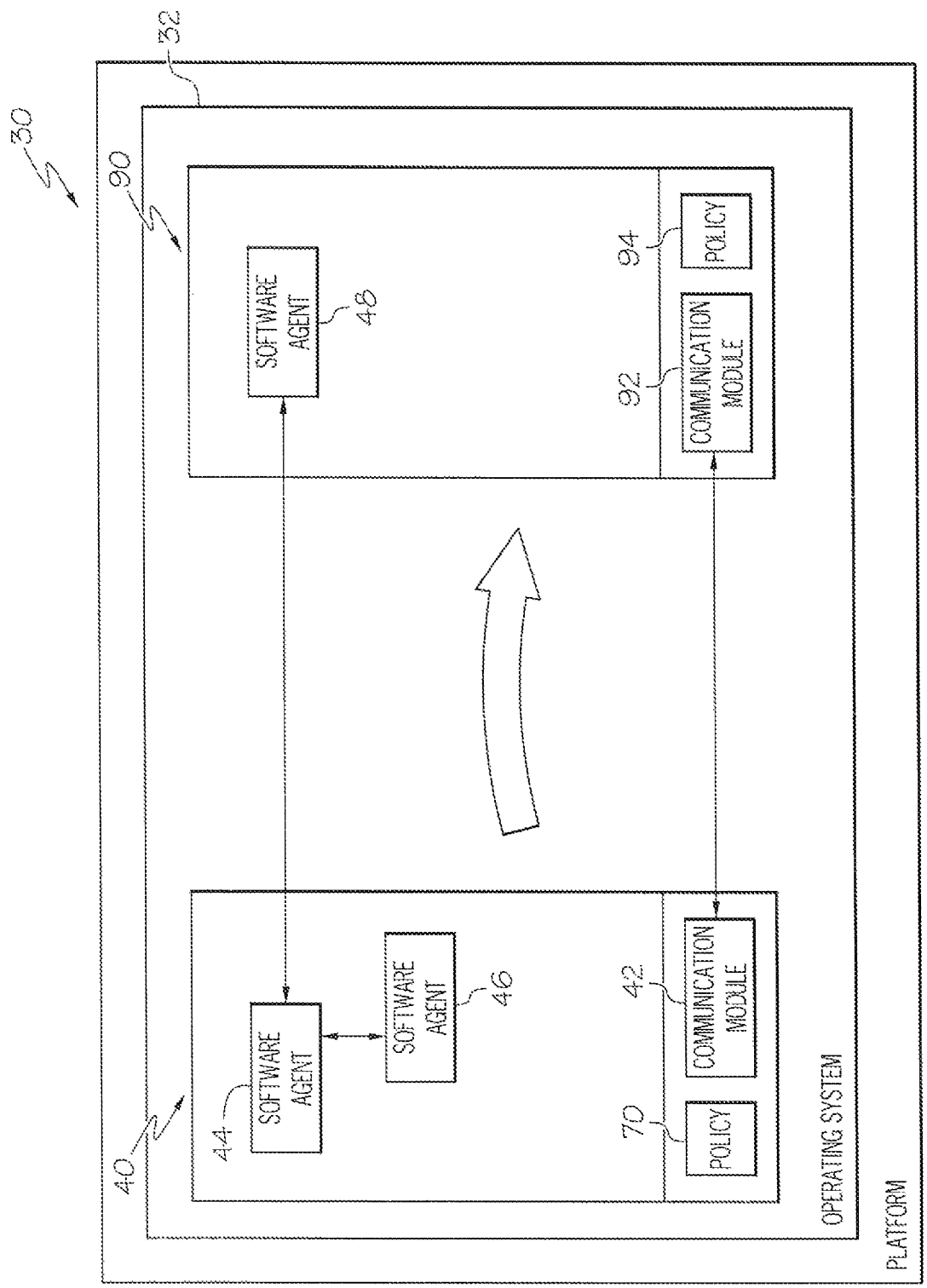
FIG. 4 is a block diagram illustrating a first management shell migrating software agents to a second management shell according to one embodiment.

FIG. 4 is a block diagram illustrating how management shell 40 is configured to migrate one or more of the software agents 44, 46, 48 to another management shell in accordance with a policy contained in the policy file 70. Particularly, management shell 40 is configured to detect a change in the requirements or policies used to manage software agent 48. For example, the management shell 40 may receive an explicit indication from software agent 48 indicating that it can no longer execute on management shell 40. Alternatively, the indication may come from another management shell advertising its capabilities. However the change is detected, the management shell 40, determines whether there is another management shell on the same platform 30 that is able to handle software agent 48 responsive to the detection. If another management shell that is able to handle software agent 48 is available on platform 30, such as management shell 90, management shell 40 will establish communications link with management shell 90 via communication modules 42, 92, and copy or move software agent 48 over that link. Additionally, management shell 40 may copy its policies in policy file 70 with respect to software agent 48 to the policy file 94 of management shell 90 so that management shell 90 may manage and control software agent 48.

In some cases, a suitable target management shell may not exist or be available on platform 30. Therefore, in at least one embodiment, management shell 40 is configured to spawn or instantiate a copy of itself on platform 30 as management shell 90. Once management shell 90 is instantiated, management shell 40 establishes the communication link between communication modules 42, 92, and communicates its policies with respect to software agent 48 to a policy file 94 on management shell 90.

The previous embodiments illustrate the management shells 40, 50, 60 as they may exist on a single platform associated with a single server, such as server 14, for example. However, those of ordinary skill in the art will appreciate that the present disclosure is not limited solely to executing management shells on a single platform 30.

Figure 5:
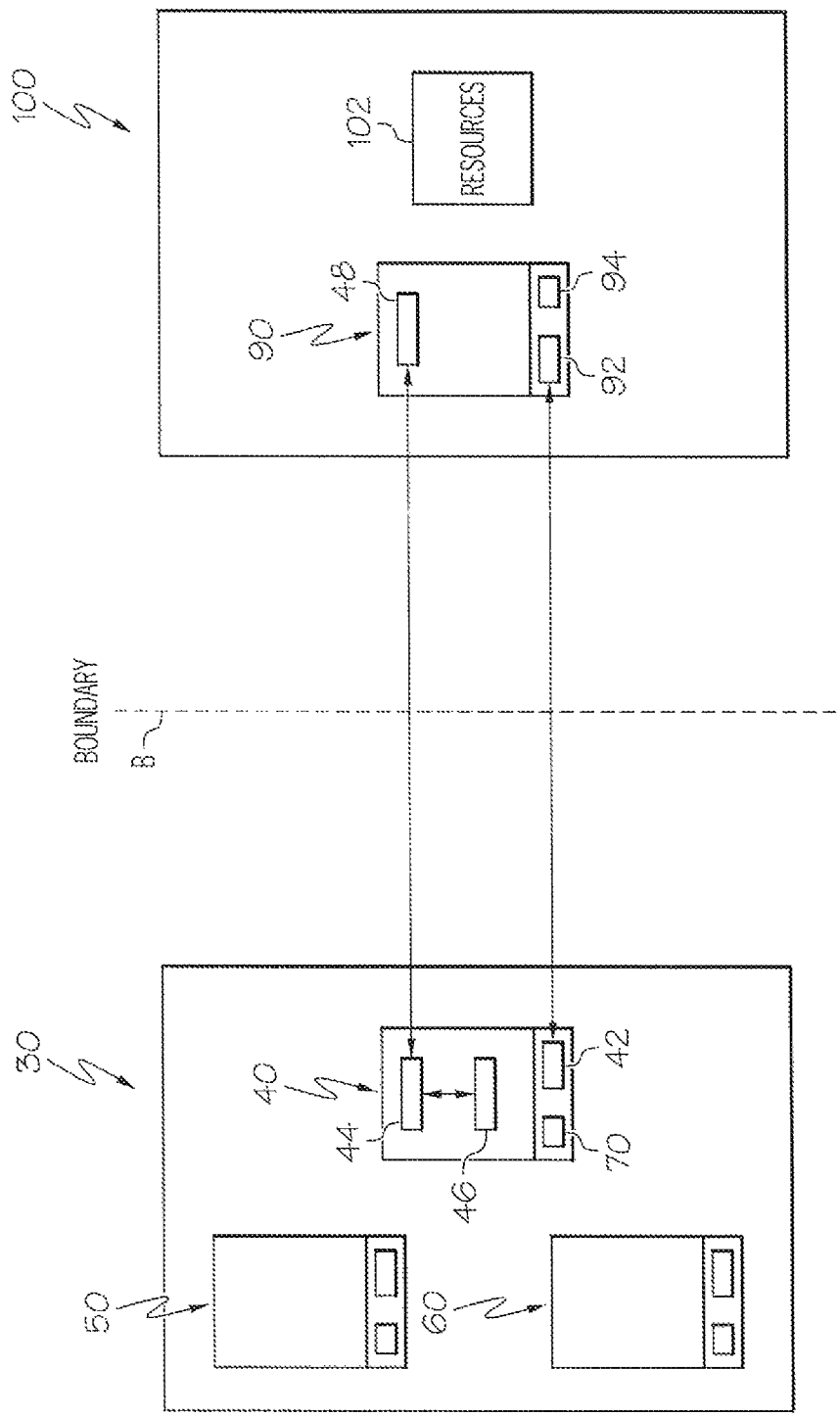
FIG. 5 is a block diagram of hardware platforms with different resources separated by a geographic boundary operating according to one embodiment.

FIG. 5 is a block diagram illustrating two different platforms 30, 100, that exist on different servers, such as server 14 and server 18 seen in FIG. 1. In this case, platforms 30, 100 each have different available resources, but are separated by a boundary B. The boundary B may be defined so as to distinguish between platforms 30, 100 wherever they happen to be physically located. For example, the boundary B can be a geographical boundary that distinguishs the platforms 30, 100 whether they are in different countries, different cities, different buildings, different floors of a building, different rooms, different racks, or different slots of an enclosure, for example.

The management shell 40 may first determine whether management shells 50, 60 can manage a given software agent (e.g., software agent 48). However, if management shell 40 determines none of the existing management shells 50, 60 can assume the responsibilities for controlling and managing software agent 48, management shell 40 may turn to other platforms, such as platform 100. In one embodiment, management shell 40 autonomously spawns itself onto platform 100 as management shell 90. As previously described, management shell 90 may receive or generate a default policy file 94 to store a set of default policies. Thereafter, once management shell 90 is fully instantiated, management shell 40 may communicate the policies associated with software agent 48 from its policy file 70 to management shell 90, where they are saved in policy file 94. Management shell 40 can then move or copy the software agent (e.g., software agent 48) from platform 30 to platform 100. Thereafter, the software agent 48 is executed on management shell 90 in accordance with policies in policy file 94, and may be removed from management shell 40.

It should be noted that the policies in policy file 70 may be configured to control whether the software agents on the different platforms 30, 100 communicate with each other. For example, policies in policy file 70 may prevent the software agents 44, 46 from communicating with newly migrated software agent 48 because it is located on the other side of boundary B. A similar policy may prevent software agent 46 from continuing to communicate with software agent 44 because software agent 44 is communicating with software agent 48, which is located on the other side of boundary B. In this way, software agent 46 can be sequestered so as to protect valuable data associated with software agent 46, prevent the exportation of certain technologies to other countries, and enable other data protection or security features.

Similarly, a policy in policy file 70 may allow software agent 44 to communicate with software agent 48, but because of boundary B, prohibit software agent 44 from executing directly on platform 100, and/or from accessing certain hardware or software resources 102 that are only associated with platform 100. Such resources 102 may include, for example, a graphics card, a printer, a scanner, a processor, a hard disk, memory, and the like. In such cases, software agent 48 with access to resources 102 may be configured to provide services to software agent 44 via the established communications link, thereby functioning as a proxy for software agent 44. This would enable other software agents such as software agent 46 to take advantage of hardware and/or software resources 102 via software agents 44 and 48, despite not being permitted to execute directly on platform 100.

Figure 6:
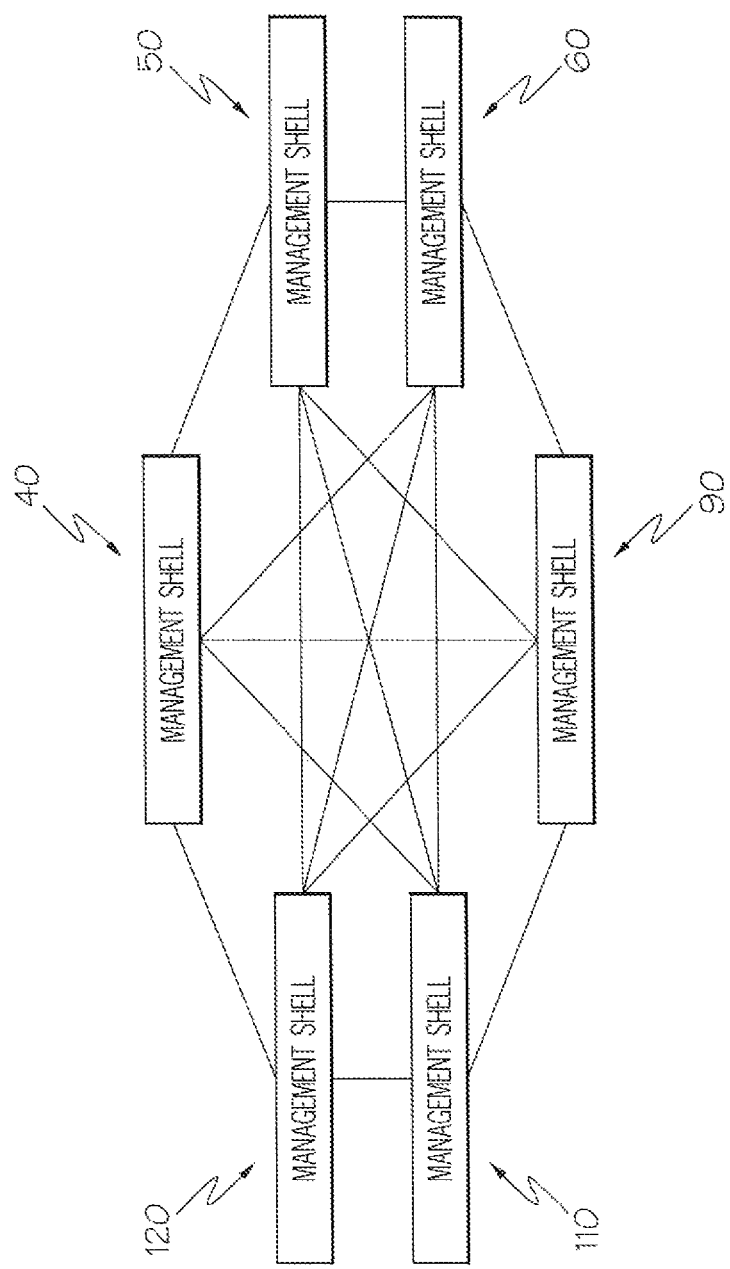
FIG. 6 is a block diagram of a meshed network of management shells communicating with each other according to one embodiment.

FIG. 6 is a block diagram of a fully-meshed network of management shells 40, 50, 60, 90, 110, and 120 communicating with each other according to one embodiment. Each of these management shells may be executing on a single platform or on multiple platforms. Management shells 40, 50, 60, 90, 110, and 120 communicate with each other via respective communication modules in order to exchange or propagate policy information, advertise capabilities, and make migration requests for different software agents. For example, management shell 40 may broadcast information to the other management shells 50, 60, 90, 110, and 120 indicating that it has certain hardware and/or software resources available. In response, the other management shells 50, 60, 90, 110, and 120 could send a request message to management shell 40, as previously described, requesting that it accept the migration of a software agent into its execution environment. Management shell 40 can then accept the request and receive the software agent from the requesting management shell, as described previously, or deny the request. In this way, software agents can be migrated between management shells in order to optimally and adequately meet software agent requirements, or to address shifting requirements experienced by the software agents.

Figure 7:
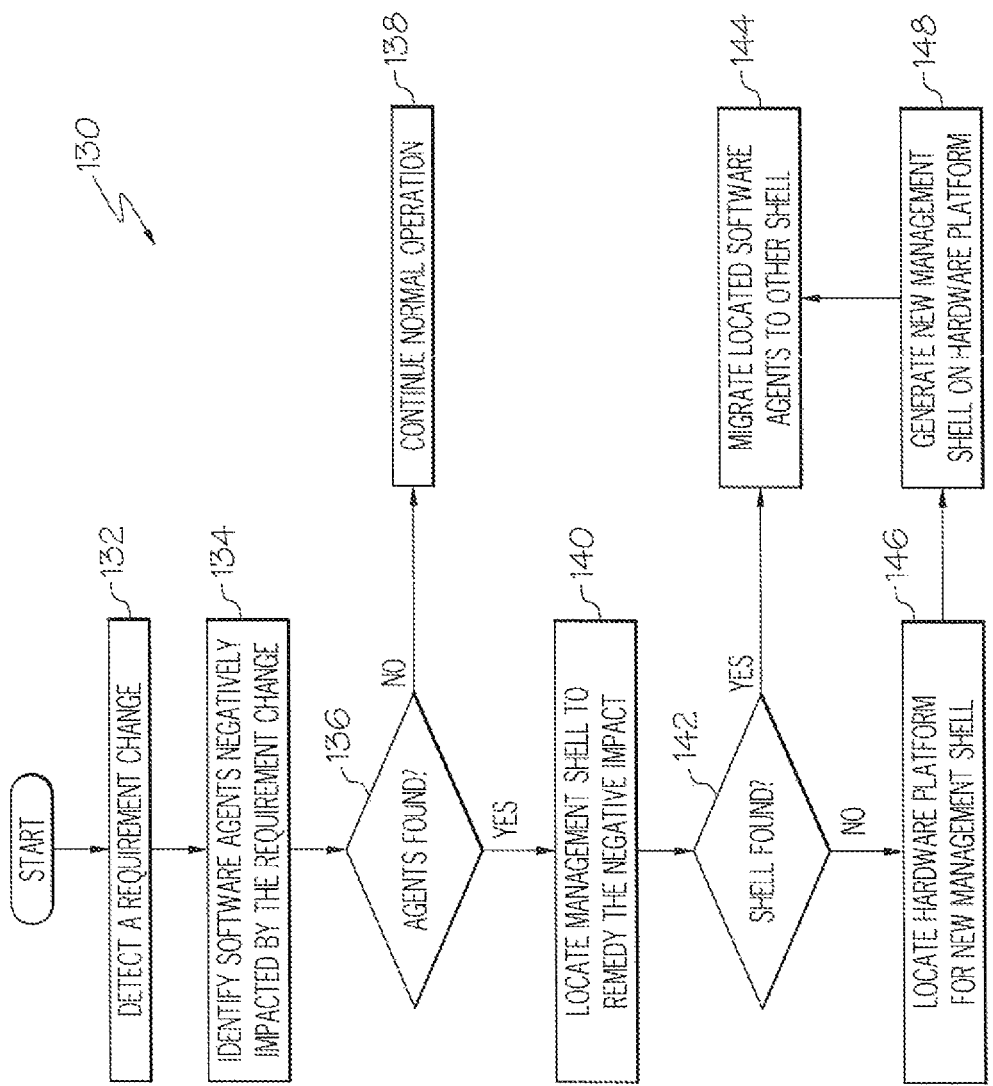
FIG. 7 is a flow chart illustrating a management shell responding to a requirement change according to one embodiment.

FIG. 7 is a flow chart illustrating a method 130, performed by a management shell such as management shell 40, for responding to a requirement change according to one embodiment. Requirement changes are dynamically detected by the management shell, and indicate an event or condition that could negatively impact a software agent executing within the management shell, thereby causing the management shell to alter the way it controls and/or manages the impacted software agents. For example, a requirement change may be an indication revoking the authority of the management shell to execute a particular software agent, or an indication that the hardware and/or software resources required by a particular software agent are not available on the current hardware platform. Other examples are the receipt of an indication or command that a given software agent must execute on a particular platform that is accessible by a particular user, or an indication that new hardware and/or software has been installed on the current platform. Whatever the requirement change, however, the change may cause the software agents to fall out of compliance with a policy of a management shell, or be executed within the management shell less optimally.

The management shells may dynamically detect such requirement changes using any known method. By way of example, management shells may detect changing conditions within its own execution environment or platform, or receive messages or other indications from the software agents that it controls and manages. In some embodiments, the management shell receives messages from other management shells and/or platforms indicating a change in the requirements. Regardless of where the requirement change indications originate, however, the management shells are configured to automatically adjust their operation accordingly to compensate for the changing conditions affecting the software agents.

In the embodiment of FIG. 7, method 130 begins with the management shell 40 detecting a requirement change (box 132). As previously stated, the management shell 40 may detect the requirement change on its own, or receive a message or signal, for example, informing the management shell 40 of the change. Upon detecting the change, management shell 40 will determine whether any of its software agents currently executing in its environment will be negatively impacted by the requirement change (box 134). If no software agents are found to be negatively impacted by the requirement change (box 136), then normal operation will continue (box 138). If, however, the management shell 40 determines that software agents will be negatively impacted by the requirement change (box 136), then the management shell 40 will adjust its operation to compensate for the change.

More particularly, the management shell 40 may, in one embodiment, attempt to locate another management shell, such as management shell 50, for example, which is able to manage the negatively impacted software agents in view of the requirement change (box 140). Such decisions may be based on the advertised capabilities of the other management shells, as previously described. Particularly, the management shell 40 may store the advertised capabilities of the other management shells in memory. Responsive to the detected change indication, management shell 40 may evaluate those stored capabilities and determine which of the other management shells are able to better control and manage the negatively impacted software agent.

If management shell 40 determines that another existing management shell can manage the negatively impacted software agent (box 142), management shell 40 may generate and send a request to migrate the negatively impacted software agent to the selected target management shell. If the target management shell accepts the request, then management shell 40 will migrate the negatively impacted software agent to the target management shell (box 144). For example, management shell 40 may cease or suspend execution of the negatively affected software agent, and copy the negatively affected software agent to the target management shell via communication module 42, as previously described. Additionally, management shell 40 may also communicate any state information, parameters, and data associated with the negatively affected software agent to the target management shell. Upon receipt, the target management shell will initiate execution of the software agent and store the associated data and information in memory. The management shell 40 may then remove the negatively affected software agent from its memory and cease performing the functions associated with the negatively impacted software agent.

In cases where both the target management shell and management shell 40 reside on the same platform, management shell 40 may not migrate a copy of the code. Instead, management shell 40 may simply provide a migration message to the target management shell including pointers to an address of the code and data in memory. The target management shell would, upon receipt of the migration message, execute the software agent using the communicated pointers and take over the management and control of the software agent. Management shell 40 could then relinquish its management and control responsibilities of the software agent by, for example, releasing any resources associated with the negatively impacted software agent and removing the negatively impacted software agent from its execution environment.

If a management shell cannot be found (box 142), the management shell 40 will instead locate a suitable platform and instantiate a new management shell (box 146). The suitable platform may be the same platform as that associated with management shell 40, or a completely different platform. Therefore, such a search may comprise locating a different server on which the new management shell can operate. Once a suitable platform is located, the management shell 40 generates the new management shell on the new platform, and migrates the negatively impacted software agent to the new management shell.

By way of example, the management shell 40 may first send a copy of the management shell code currently managing the negatively affected software agent to the new platform, where it is stored in memory. Management shell 40 may then send a command to the new platform to instantiate that copy of the new management shell code. Once the new management shell is instantiated, management shell 40 may send a request to the new management shell to migrate the negatively impacted software agent to the new management shell. Upon acceptance of the request, management shell 40 sends a copy of the software agent code, as well as any policies associated with the negatively impacted software agent, to the new management shell. After the negatively impacted software agent is executing within the new management shell, management shell 40 may remove the negatively affected software agent from its execution environment.

In one embodiment, the platform on which the new management shell executes may comprise hardware and/or software resources that are not available to the platform on which management shell 40 is executing. However, the new management shell may not initially be aware of these resources upon instantiation, and thus, may not be fully aware of its ability to adequately service the software agent when it is instantiated on the new platform. However, according to the disclosure, the new management shell is configured to learn of the resources over time. Therefore, in at least one aspect, the new management shell would accept the migrated software agent from management shell 40, and then measure its performance with respect to the migrated software agent over time. The new management shell could then analyze those metrics periodically to learn whether it is performing adequately. Based on the analysis, the new management shell may adjust its policies, and/or request the new resources on behalf of the software agent to optimize execution of the software agent.

Figure 8:
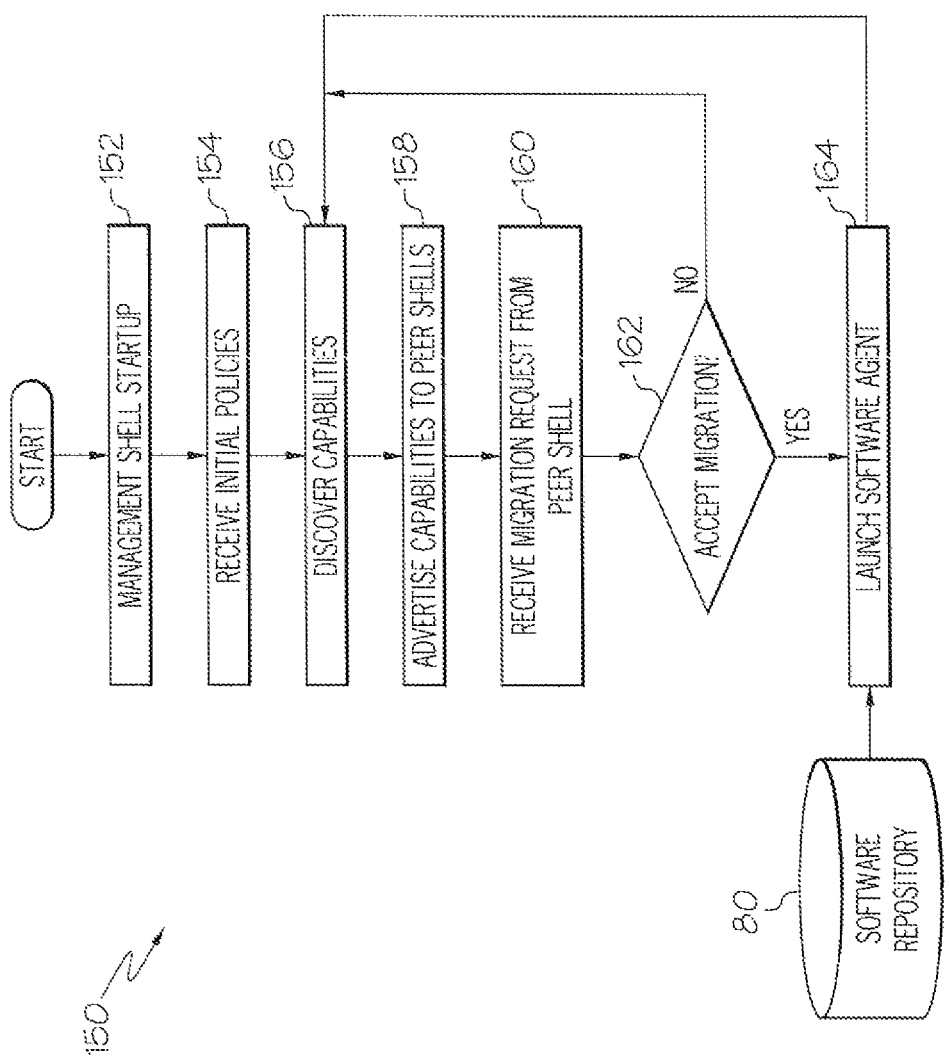
FIG. 8 is a flow chart illustrating a management shell startup procedure and learning sequence according to one embodiment.

FIG. 8 is a flow chart illustrating a method 150 for a management shell startup and learning sequence according to one embodiment of the present disclosure. As seen in FIG. 8, method 150 begins with the instantiation of the management shell (box 152). The management shell may be instantiated automatically by a peer management shell, such as management shell 40 above, or manually by an administrator. Once the management shell is executing, it is configured to receive some initial policies that will govern its execution (box 154). The policies can be received, for example, from peer management shells. In these cases, the management shell may be configured to listen on a specific communications port and establish a communications session with a peer management shell to request and receive the policies. Alternatively, the management shell may request the policy information from a predefined network node. In some aspects, the management shell can receive the initial policy information from an administrator or operator that manually enters the information.

Once the management shell is executing in accordance with the initial policies, the management shell is configured to discover its own capabilities (box 156). For example, the management shell may perform an inventory of the local hardware platform and software resources, and integrate that hardware/software resource data into its policy information. Additionally, the management shell is also configured to monitor the performance of the software agents executing within its environment over time, and integrate that performance data into its policy information. Such information will help the management shell to adapt to the changing needs of the software agents executing within its execution environment over time, as well as allow the management shell to manage the software agents. For example, based at least partially on this performance data, the management shell is able to determine whether it can continue to manage a given software agent optimally. If not, the management shell may find another management shell that can manage the software agent based on the known needs and performance of the software agent and on the advertised capabilities of other management shells.

Upon discovering its capabilities (box 156), the management shell will advertise those capabilities to other peer management shells using any known method (box 158). In one embodiment, for example, the management shell generates a message identifying its capabilities, and then broadcasts that capabilities message to one or more peer management shells. Upon receipt, the peer management shells propagate that message to other peer management shells throughout the network.

The management shell may also receive requests to migrate a software agent from a peer management shell (box 160), possibly in response to the management shell advertising its capabilities. If the management shell denies the request to receive a given software agent (box 162), the management shell will continue to discover its own capabilities over time (box 156), periodically advertise its capabilities to the other peer management shell shells (box 158), and service migration requests from peer management shells (box 160) as necessary. However, if the management shell accepts a migration request to receive a software agent from a peer management shell (box 162), the management shell will launch the software agent within the management shell's execution environment (box 164). This may include obtaining or receiving the software agent's executable code from a software repository 80, as previously described. Once the new management shell is executing the software agent, the management shell may discover additional capabilities and resources (box 156) and advertise those updated capabilities to the other peer management shells as previously described.

In an illustrative example of the foregoing methods, consider an entity, such as a business, for example, that has an unlimited license to use File Transfer Protocol (FTP) services, but is not licensed to use Secure Shell (SSH) services, even though both the FTP service and the SSH service are stored in a software repository 80 within the business's datacenter. In this case, the management shells might have a policy that allows launching any desired number of instances of the FTP service within the company, but prohibits the launching of the SSH service, as this would be a violation of the global software licensing policy.

In another example, consider a scenario where the business entity wishes to institute a new security policy that allows execution of the FTP service on all hardware platforms except those located in a specific geographical area, such as North Carolina. In these cases, the policy information associated with the management shells would be updated and propagated among the other management shells in the system. However, this would also cause any FTP services currently executing on North Carolina hardware platforms to fall out of compliance with the updated security policy. The management shells of the present disclosure, therefore, are configured to detect such conflicts and dynamically rectify the conflicts between the updated security policy and any non-compliant FTP services currently executing within their execution environments.

Particularly, the management shells executing in a prohibited geographical area (e.g., North Carolina) may take any number of approaches to accomplish this function. For example, one approach would be for the management shells within North Carolina to terminate any currently executing FTP services, and allow other entities within the network to react to the loss of the service. In such cases, management shells executing FTP services on hardware/software platforms physically located in other states may receive an updated capabilities message from the management shells executing on the North Carolina platforms indicating that the North Carolina platforms are prohibited from executing FTP services. Upon receipt of the message, the management shells in these other jurisdictions would then compensate for the management shells located in North Carolina by accepting future FTP requests and handling the traffic that the North Carolina management shells would normally have handled.

Another approach would be to migrate a currently executing FTP service from a management shell executing on a platform located in North Carolina to a peer management shell executing on a platform located in another state. In these situations, the North Carolina management shell is aware of the capabilities of the peer management shells because it receives the capability messages from the peer management shells. Armed with this knowledge, the management shell in North Carolina may communicate a request to a selected one of the other peer management shells to launch its own FTP service. Once the management shell receives an indication that the selected peer management shell has granted the request and launched an FTP service, the management shell executing in North Carolina can terminate its FTP service.

In another approach, the management shell executing on the platform located in North Carolina is configured to instantiate a new management shell on a platform that is not located in North Carolina specifically to resolve this conflict. This approach may be necessary, for example, when no other existing management shell is able to accept a request to receive a migrated FTP service. For example, all currently existing management shells in the network might be executing on platforms located in North Carolina, and therefore, would fail to comply with the updated security policy that prohibiting the execution of the FTP service on North Carolina platforms. It is with this approach that it becomes clear how the management shell infrastructure autonomously expands to meet the changing needs of a business.

Particularly, a given management shell can meet new or shifting requirements by creating new management shells that will fulfill the requirements of distressed or non-compliant software agents, or of the management shell itself. The management shell will then establish communication with the new management shell, propagate policy and configuration information to the new management shell, and migrate one or more software agents to the new management shell such that the needs of the software agent, and the businesses that require those services are met. The new management shell can then advertise its new capabilities and capacity to other management shells in the network.

Thus, new management shells may be instantiated having little to no knowledge of their own capabilities. However, these management shells are configured to learn those capabilities over time responsive to evaluating the hardware platform it is running on, and/or the performance of the software agents running within its execution environment.

Figure 9:
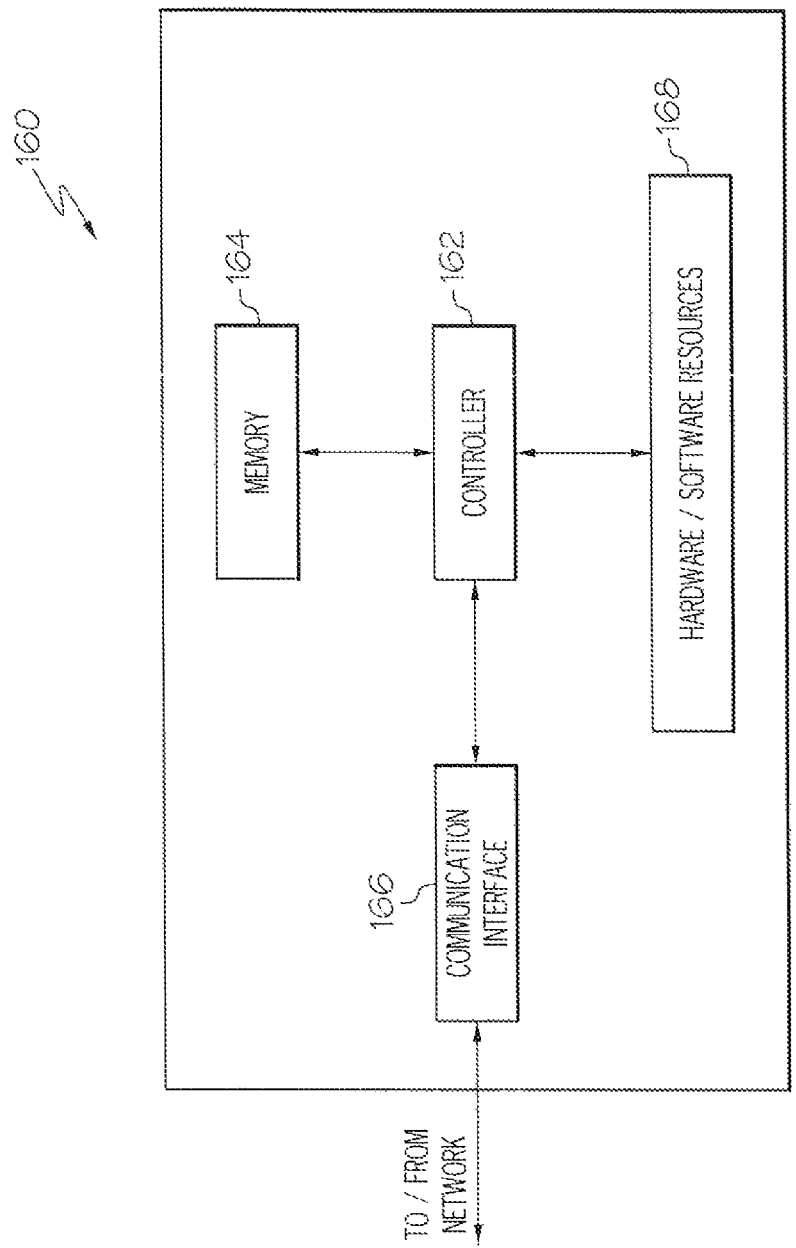
FIG. 9 is a block diagram of a computing device configured according to one embodiment.

FIG. 9 is a block diagram showing some of the components of a computing device 160, such as server 14 of FIG. 1, for example, configured to perform according to at least one embodiment of the present disclosure. As seen in FIG. 9, device 160 comprises a programmable controller 162, a memory 164, a communications interface 166, and a pool of hardware and/or software resources 168. Those of ordinary skill in the art will appreciate that other components, while not specifically shown, may be present in device 160 as needed or desired.

Programmable controller 162 may be implemented by one or more microprocessors, hardware, firmware, or a combination thereof, and generally controls the operation and functions of the computing device 160 according to instructions and data stored in memory 164. Such operations and functions include, but are not limited to, executing the functions of one or more management shells and the associated software agents according to the embodiments previously described. In at least one embodiment, the programmable controller 162 is configured to detect whether a given management shell or software agent is distressed or non-compliant with a set of known policies, and instantiate, according to the management shells instructions, other management shell instances as previously described. The programmable controller 162 is also configured to move or migrate software agents between management shells, as previously described.

The memory circuit 164, or simply "memory" 164, may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory 164 stores programs and instructions, such as the management shells, software agents, operating system, policies, and the like.

The communications interface 166 comprises a transceiver or other communications interface known in the art that facilitates the communications with remote devices such as application servers and user devices. Such an interface may comprise, for example, an ETHERNET component capable of communicating data and information over a communications network as is known in the art The hardware/software resources 168 are the resources that are utilized by the management shells and/or the software agents when executing on device 160, and may be allocated/de-allocated by controller 162 using any method known in the art. Some examples of the hardware and software resources that may be allocated/de-allocated include, but are not limited to, memory resources, software service resources, graphics processing resources, communication resources, display resources, and the like.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method comprising:
   executing, on a computer system, a plurality of management shells, each of which is executable to provide an execution environment that performs functions with respect to control and management of one or more software agents running in the execution environment;
   instantiating, on the computer system, a first, additional management shell operable to provide an execution environment for one or more software agents;
   receiving, with the first management shell running on the computer system, a policy useable to govern the execution of the first management shell;
   executing, on the computer system, the first management shell according to the policy, wherein the executing is governed by the policy and wherein executing the first management shell includes the first management shell discovering its own capabilities and gathering performance data about execution of one or more software agents with the execution environment of the first management shell;
   executing, within the execution environment of the first management shell, a particular software agent;
   receiving, from respective ones of the plurality of management shells, respective discovered capabilities of the ones of the plurality of management shells;
   determining, with the first management shell, to migrate the particular software agent;
   identifying, based on the respective discovered capabilities and the gathered performance data, a second management shell to manage the particular software agent; and
   sending, from the first management shell to the second management shell, a request to migrate the particular software agent from the first management shell to the second management shell.

2. The method of claim 1, wherein instantiating the first management shell includes one of the plurality of management shells instantiating the first management shell.

3. The method of claim 1, wherein receiving the policy includes receiving the policy from one of the plurality of management shells.

4. The method of claim 1, wherein receiving the policy includes receiving the policy from a predefined network node of the computer system.

5. The method of claim 1, wherein the first management shell discovering its own capabilities includes:
   the first management shell gathering data about local hardware platform resources and local software resources, and
   the first management shell modifying the policy using the gathered data about local hardware platform resources and local software resources.

6. The method of claim 1, further comprising:
   continuing to discover, with the first management shell, capabilities of the first management shell;
   periodically broadcasting, by the first management shell to ones of the management shells, the discovered capabilities of the first management shell; and
   responding, with the first management shell, to requests to migrate respective software agents from a respective management shells to the first management shell.

7. A non-tangible, computer-readable medium storing instructions that when executed by a computer system cause the computer system to perform operations comprising:
   executing, on the computer system, a plurality of management shells, each of which is executable to provide an execution environment that performs functions with respect to control and management of one or more software agents running in the execution environment;
   instantiating, on the computer system, a first, additional management shell operable to provide an execution environment for one or more software agents;
   receiving, with the first management shell running on the computer system, a policy useable to govern the execution of the first management shell;
   executing, on the computer system, the first management shell according to the policy, wherein the executing is governed by the policy and wherein executing the first management shell includes the first management shell discovering its own capabilities and gathering performance data about execution of one or more software agents with the execution environment of the first management shell;
   executing, within the execution environment of the first management shell, a particular software agent;
   receiving, from respective ones of the plurality of management shells, respective discovered capabilities of the ones of the plurality of management shells;
   determining, with the first management shell, to migrate the particular software agent;
   identifying, based on the respective discovered capabilities and the gathered performance data, a second management shell to manage the particular software agent; and sending, from the first management shell to the second management shell, a request to migrate the particular software agent from the first management shell to the second management shell.

8. The computer-readable medium of claim 7, wherein instantiating the first management shell includes one of the plurality of management shells instantiating the first management shell.

9. The computer-readable medium of claim 7, wherein receiving the policy includes receiving the policy from one of the plurality of management shells.

10. The computer-readable medium of claim 7, wherein receiving the policy includes receiving the policy from a predefined network node of the computer system.

11. The computer-readable medium of claim 7, wherein the first management shell discovering its own capabilities includes:
    the first management shell gathering data about local hardware platform resources and local software resources, and
    the first management shell modifying the policy using the gathered data about local hardware platform resources and local software resources.

12. The computer-readable medium of claim 7, the operations further comprising:
    continuing to discover, with the first management shell, capabilities of the first management shell;
    periodically broadcasting, by the first management shell to ones of the management shells, the discovered capabilities of the first management shell; and
    responding, with the first management shell, to requests to migrate respective software agents from a respective management shells to the first management shell.

13. A computer system comprising:
a computer processor circuit;
a computer memory circuit storing instructions that when executed by the computer processor circuit cause the computer system to perform operations comprising:
    executing, on the computer system, a plurality of management shells, each of which is executable to provide an execution environment that performs functions with respect to control and management of one or more software agents running in the execution environment;
    instantiating, on the computer system, a first, additional management shell operable to provide an execution environment for one or more software agents;
    receiving, with the first management shell running on the computer system, a policy useable to govern the execution of the first management shell;
    executing, on the computer system, the first management shell according to the policy, wherein the executing is governed by the policy and wherein executing the first management shell includes the first management shell discovering its own capabilities and gathering performance data about execution of one or more software agents with the execution environment of the first management shell;
    executing, within the execution environment of the first management shell, a particular software agent;
    receiving, from respective ones of the plurality of management shells, respective discovered capabilities of the ones of the plurality of management shells;
    determining, with the first management shell, to migrate the particular software agent;
    identifying, based on the respective discovered capabilities and the gathered performance data, a second management shell to manage the particular software agent; and
    sending, from the first management shell to the second management shell, a request to migrate the particular software agent from the first management shell to the second management shell.

14. The computer system of claim 13, the operations further comprising:
    continuing to discover, with the first management shell, capabilities of the first management shell;
    periodically broadcasting, by the first management shell to ones of the management shells, the discovered capabilities of the first management shell; and
    responding, with the first management shell, to requests to migrate respective software agents from a respective management shells to the first management shell.

* * * * *